US00RE50873E

(19) United States
(12) Reissued Patent
Noda et al.

(10) Patent Number: US RE50,873 E
(45) Date of Reissued Patent: Apr. 21, 2026

(54) DATA STORAGE DEVICE COMPRISING DUAL CHANNEL PREAMP CIRCUIT

(71) Applicant: Western Digital Technologies, Inc., San Jose, CA (US)

(72) Inventors: Junzo Noda, Fujisawa (JP); John T. Contreras, Palo Alto, CA (US); Masahito Kobayashi, Fujisawa (JP)

(73) Assignee: Western Digital Technologies, Inc., San Jose, CA (US)

(21) Appl. No.: 18/916,491

(22) Filed: Oct. 15, 2024

Related U.S. Patent Documents

Reissue of:
(64) Patent No.: 10,896,695
Issued: Jan. 19, 2021
Appl. No.: 16/861,565
Filed: Apr. 29, 2020

(51) Int. Cl.
*G11B 5/09* (2006.01)
*G11B 5/29* (2006.01)
*G11B 5/596* (2006.01)
*G11B 20/10* (2006.01)

(52) U.S. Cl.
CPC ..... *G11B 20/10027* (2013.01); *G11B 5/29* (2013.01); *G11B 5/59655* (2013.01); *G11B 5/59666* (2013.01)

(58) Field of Classification Search
CPC . G11B 20/10027; G11B 5/29; G11B 5/59655; G11B 5/59666
See application file for complete search history.

(56) References Cited

U.S. PATENT DOCUMENTS

| | | | | |
|---|---|---|---|---|
| 5,805,386 | A | 9/1998 | Faris | |
| 6,483,659 | B1 | 11/2002 | Kobayashi et al. | |
| 6,606,216 | B1 * | 8/2003 | Liikanen | G11B 5/59683 360/77.08 |
| 6,693,760 | B1 | 2/2004 | Krounbi et al. | |
| 7,133,233 | B1 | 11/2006 | Ray et al. | |
| 8,390,948 | B2 | 3/2013 | Hogg | |
| 8,947,816 | B1 | 2/2015 | Ryan et al. | |
| 9,361,919 | B1 | 6/2016 | Lieu et al. | |
| 9,679,602 | B2 | 6/2017 | German et al. | |
| 10,255,943 | B1 | 4/2019 | Schick et al. | |
| 10,431,257 | B1 * | 10/2019 | Ehrlich | G11B 5/4873 |

* cited by examiner

*Primary Examiner* — Woo H Choi
(74) *Attorney, Agent, or Firm* — Patterson + Sheridan, LLP

(57) ABSTRACT

A data storage device is disclosed comprising a top head actuated over a top surface of a first disk, a bottom head actuated over a bottom surface of the first disk, a top head actuated over a top surface of a second disk, and a bottom head actuated over a bottom surface of the second disk. A dual channel preamp circuit is coupled to the top and bottom heads of the first and second disks, wherein a selection signal is applied to the dual channel preamp circuit to select between the first disk and the second disk. A concurrent access operation of the top and bottom surface of the selected disk is executed using the dual channel preamp circuit.

15 Claims, 6 Drawing Sheets

DATA STORAGE DEVICE COMPRISING DUAL CHANNEL PREAMP CIRCUIT

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*This application is an application for reissue of U.S. Pat. No. 10,896,695, which is incorporated herein by reference in its entirety.*

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and embedded servo sectors. The embedded servo sectors comprise head positioning information (e.g., a track address) which is read by the head and processed by a servo controller to control the velocity of the actuator arm as it seeks from track to track.

A disk drive typically comprises a plurality of disks each having a top and bottom surface accessed by a respective head. That is, the VCM typically rotates a number of actuator arms about a pivot in order to simultaneously position a number of heads over respective disk surfaces based on servo data recorded on each disk surface. FIG. 1 shows a prior art disk format 2 as comprising a number of servo tracks 4 defined by servo sectors $\mathbf{6}_0$-$\mathbf{6}_N$ recorded around the circumference of each servo track. Each servo sector $\mathbf{6}_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $\mathbf{6}_i$ further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

DETAILED DESCRIPTION

Figure 2A:
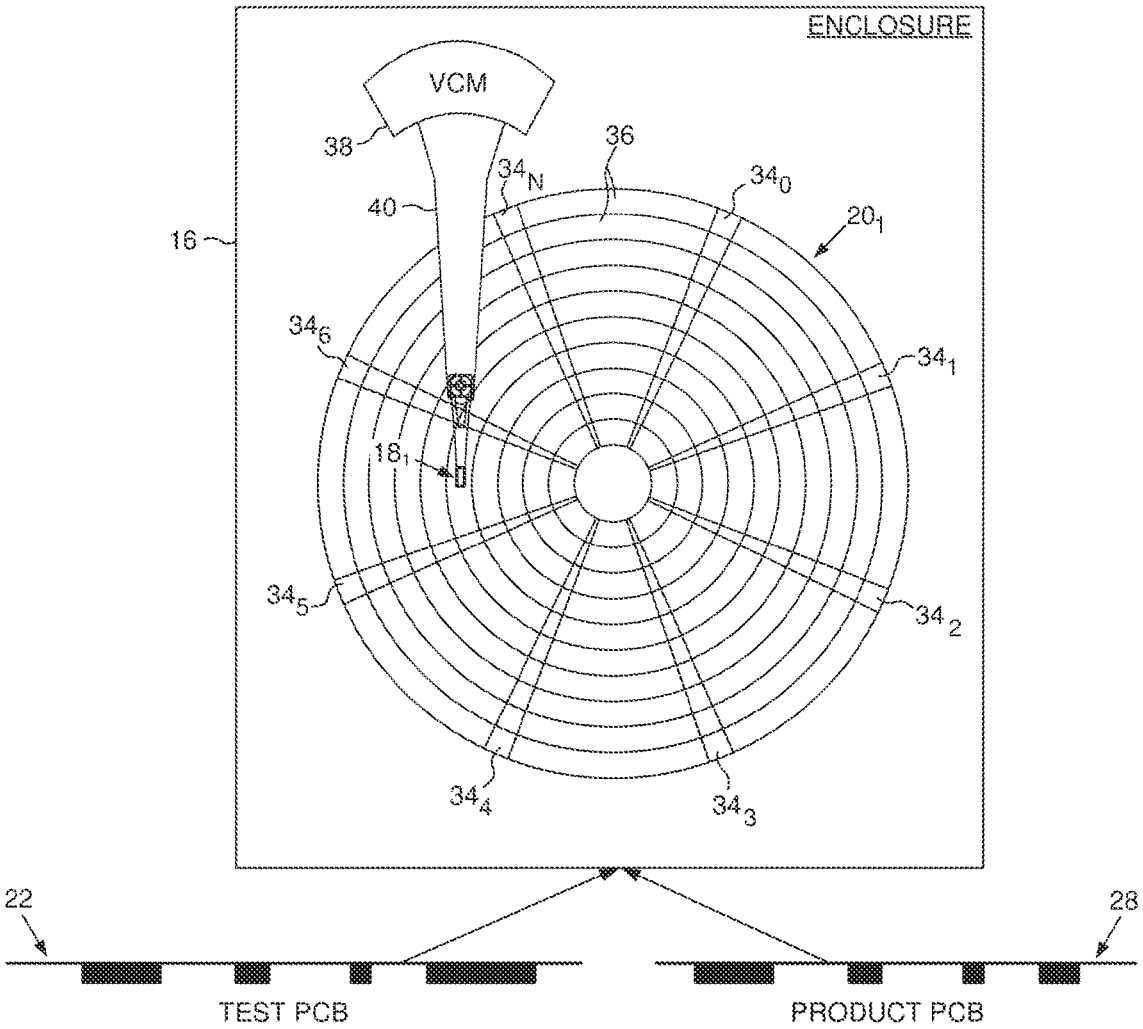
FIG. 2A shows a data storage device according to an embodiment comprising an enclosure having at least two heads actuated over respective disk surfaces.
Figure 2B:
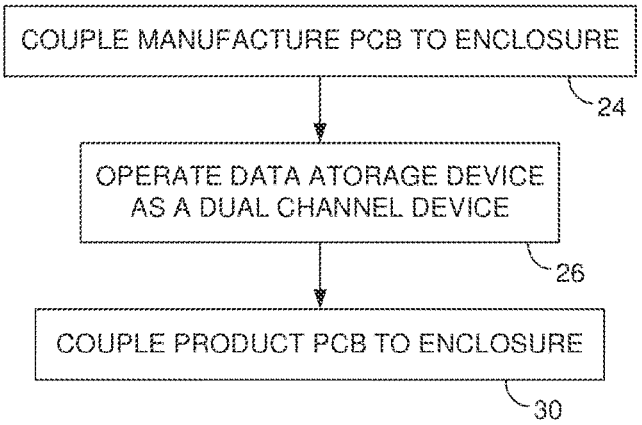
FIG. 2B shows a method of operation the data storage device according to an embodiment wherein a manufacture printed circuit board (PCB) is coupled to the enclosure during a manufacturing procedure, and then a product PCB is coupled to the enclosure.

FIG. 2A shows a data storage device in the form of a disk drive according to an embodiment comprising an enclosure 16 comprising a first head $\mathbf{18}_1$ actuated over a first disk surface $\mathbf{20}_1$ and a second head $\mathbf{18}_2$ (not shown) actuated over a second disk surface $\mathbf{20}_2$. FIG. 2B is a flow diagram according to an embodiment wherein a manufacture printed circuit board (PCB) 22 is coupled to the enclosure (block 24), wherein the manufacture PCB 22 comprises at least one dual channel configured to execute concurrent access operations. While the manufacture PCB is coupled to the enclosure, the data storage device is operated as a dual channel device (block 26). The manufacture PCB 22 is decoupled from the enclosure and a product PCB 28 is coupled to the enclosure (block 30), wherein the product PCB comprises a single channel configured to execute a single access operation. While the product PCB is coupled to the enclosure, the data storage device is operated as a single channel device (block 32).

Figure 1:
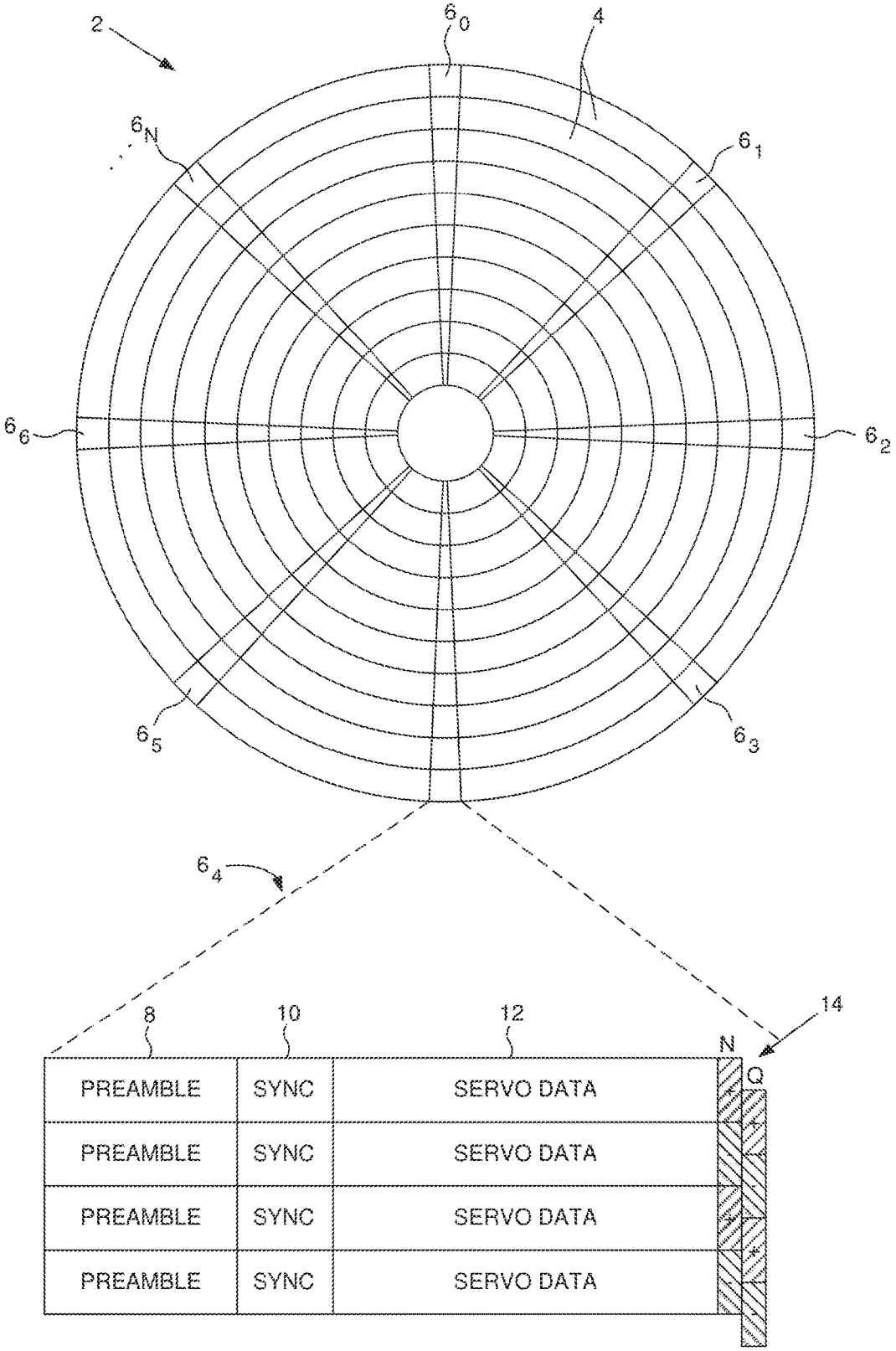
FIG. 1 (Prior Art)
FIG. 1 shows a prior art disk format comprising a plurality of servo tracks defined by servo sectors.

In the embodiment of FIG. 2A, each disk surface comprises a plurality of servo sectors $\mathbf{34}_0$-$\mathbf{34}_N$ that define a plurality of servo tracks, wherein data tracks 36 are defined relative to the servo tracks at the same or different radial density. Control circuitry processes a read signal emanating from the head to demodulate the servo sectors and generate a position error signal (PES) representing an error between the actual position of the head and a target position relative to a target track. A servo control system in the control circuitry filters the PES using a suitable compensation filter to generate a control signal applied to a VCM 38 which rotates an actuator arm 40 about a pivot in order to actuate the head radially over the disk in a direction that reduces the PES. In one embodiment, each head may also be servoed using a secondary actuator, such as a piezoelectric (PZT) actuator, configured to actuate a suspension relative to the actuator arm 40, and/or configured to actuate the head relative to the suspension. The servo sectors $\mathbf{34}_0$-$\mathbf{34}_N$ may comprise any suitable head position information, such as a track address for coarse positioning and servo bursts for fine positioning. The servo bursts may comprise any suitable pattern, such as an amplitude based servo pattern or a phase based servo pattern (FIG. 1).

Figure 3:
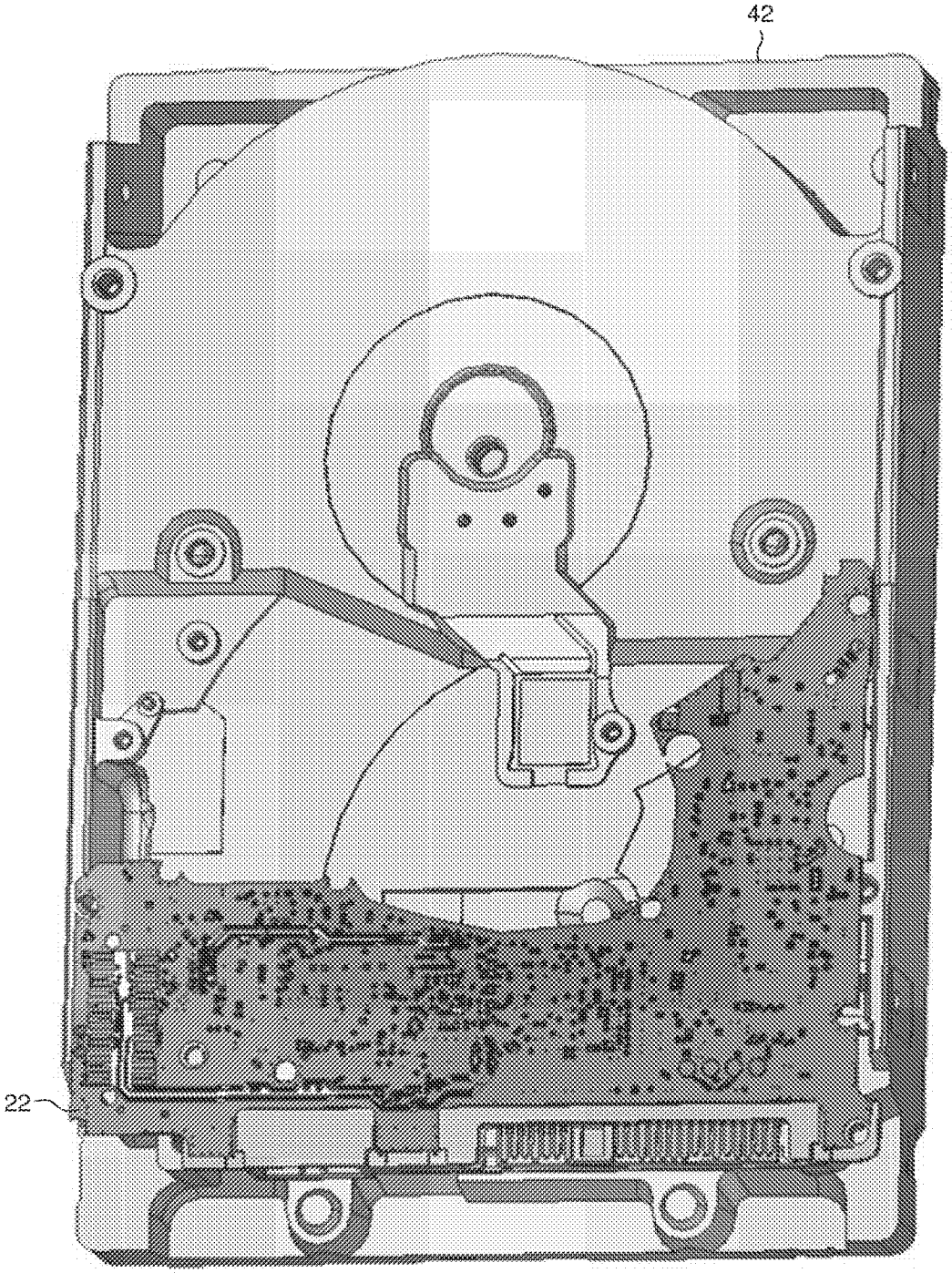
FIG. 3 shows a data storage device according to an embodiment having a PCB mounted to a bottom surface of the enclosure.

FIG. 3 shows a data storage device in the form of a disk drive wherein one or more disks, head stack assembly, and VCM such as shown in FIG. 2A are installed into a base casting 42 which is then sealed with a top cover (not shown) to form the enclosure 16. In this embodiment, the manufacture PCB 22 shown in FIG. 2A is coupled to a bottom of the base casting 42 using any suitable coupling features (e.g., clips), wherein the manufacture PCB 22 comprises a suitable interface connector for connecting to an interface cable (e.g., Serial ATA or SCSI). After executing manufacture procedures on the disk drive, the manufacture PCB 22 may be decoupled from the base casting 42 (e.g., unclipped) and the product PCB 28 coupled to the base casting 42 prior to shipping the data storage device to a customer.

In one embodiment, the enclosure 16 shown in FIG. 2A may be a pluggable module configured to plug into a manufacture station comprising the manufacture PCB 22. After executing the manufacture procedures, the module may be shipped to a customer wherein the module may be plugged into a product device, such as plugging the module into a bay of a storage array, wherein the bay may comprise the product PCB 28.

Any suitable manufacture procedure may be executed by the manufacture PCB 22, wherein in one embodiment the data storage device is operated as a dual channel device during the manufacturing procedure meaning that at least two of the heads are concurrently accessing respective disk surfaces (e.g., concurrent writes, concurrent reads, or concurrent write/read). For example, the manufacture PCB 22 may execute a servo writing procedure wherein servo sectors (such as shown in FIG. 2A) may be bank written to at least two disk surfaces in order to expedite the servo writing and/or to improve the coherency of the servo sectors across the disk surfaces. In another embodiment, the manufacture PCB 22 may execute a defect scan of the disk surfaces in order to map out defective data sectors, such as by writing/reading a test pattern to/from the disk surfaces and detecting a defect based on the read signal(s). In yet another embodiment, the manufacture PCB 22 may execute a manufacture procedure in order to measure the functionality of one or more components (e.g., a head component such as a write coil, a write assist element, a read element, a fly height actuator, a secondary actuator, etc.), or to measure a geometry of a head component, such as measuring a width of a write element, or measuring a radial and/or down-track offset between write/read elements and/or multiple read elements. Regardless as to the manufacture procedure executed, in one embodiment the manufacture PCB 22 executing concurrent access operations using at least one dual channel may help facilitate and/or expedite the manufacture procedure. After having executed the manufacturing procedures, the product PCB 28 may be coupled to the enclosure 16 and the data storage device operated as a single channel device. In this manner, the product PCB 28 may comprise fewer components compared to the manufacture PCB 22, thereby reducing the cost of the end product as well as reducing the manufacturing time of the data storage device.

Figure 4A:
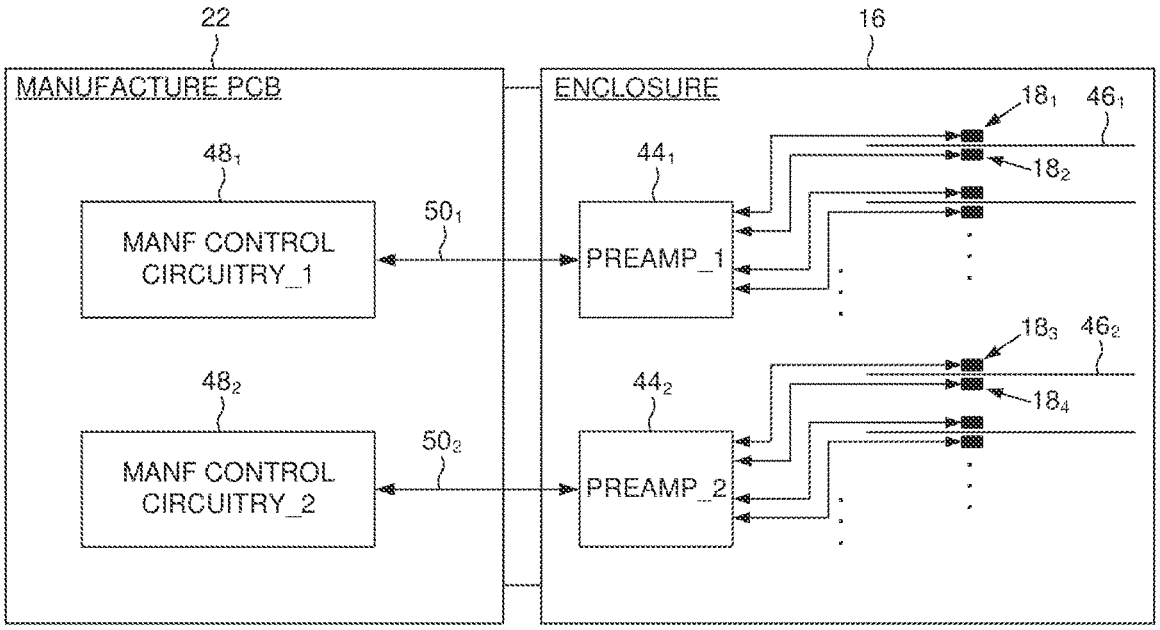
FIG. 4A shows an embodiment wherein the enclosure of the data storage device comprises a first preamp circuit and a second preamp circuit, wherein the manufacture PCB applies channel signals to each preamp circuit concurrently.

FIG. 4A shows a manufacture PCB 22 according to an embodiment coupled to the enclosure 16 through any suitable interface, such as an interface cable, plug-in connector, or wireless protocol (e.g., Wi-Fi). In this embodiment, the enclosure 16 comprises a first single channel preamp circuit $\mathbf{44}_1$ coupled to a first set of heads, such as head $\mathbf{18}_1$ actuated over the top surface of a disk $\mathbf{46}_1$ and head $\mathbf{18}_2$ actuated over a bottom surface of the disk $\mathbf{46}_1$. The enclosure 16 further comprises a second single channel preamp circuit $\mathbf{44}_2$ coupled to a second set of heads, such as head $\mathbf{18}_3$ actuated over the top surface of a disk $\mathbf{46}_2$ and head $\mathbf{18}_4$ actuated over a bottom surface of the disk $\mathbf{46}_2$. In this embodiment, the manufacture PCB 22 comprises first manufacture control circuitry $\mathbf{48}_1$ coupled to the first preamp circuit $\mathbf{44}_1$ and second manufacture control circuitry $\mathbf{48}_2$ coupled to the second preamp $\mathbf{44}_2$. Each of the manufacture control circuitry $\mathbf{48}_1$ and $\mathbf{48}_2$ may comprise any suitable circuitry, such as read channel circuitry, servo control circuitry, a microprocessor configured to execute instructions stored on a computer readable medium, etc. When executing an access operation (write/read operation), the first manufacture control circuitry $\mathbf{48}_1$ interfaces with the first preamp circuit $\mathbf{44}_1$ over interface $\mathbf{50}_1$ in order to select a target head out of the first set of heads as well as transmit a write signal during write operations and receive a read signal during read operations. Similarly, the second manufacture control circuitry $\mathbf{48}_2$ interfaces with the second preamp circuit $\mathbf{44}_2$ over interface $\mathbf{50}_2$ in order to select a target head out of the second set of heads as well as transmit a write signal during write operations and receive a read signal during read operations. In one embodiment, a first access operation executed by the first manufacture control circuitry $\mathbf{48}_1$ at least partially overlaps with a second access operation executed by the second control circuitry $\mathbf{48}_2$ in order to execute any suitable manufacture procedure as described above, thereby operating the data storage device as a dual channel device.

Figure 4B:
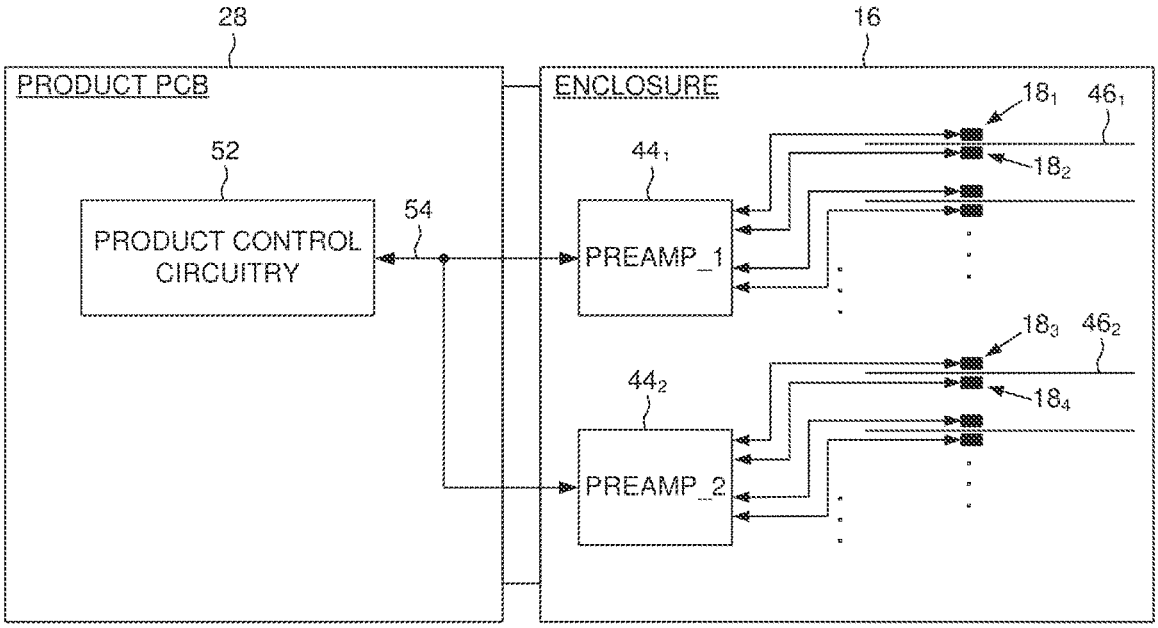
FIG. 4B shows an embodiment wherein the product PCB applies a channel signal to one of the first or second preamp circuits.

FIG. 4B shows a product PCB 28 according to an embodiment coupled to the enclosure 16 through any suitable interface, such as an interface cable, plug-in connector, or wireless protocol (e.g., Wi-Fi). In this embodiment, the product PCB 28 comprises product control circuitry 52 coupled to the first preamp circuit $\mathbf{44}_1$ and to the second preamp $\mathbf{44}_2$ over interface 54. In one embodiment, the product control circuitry 52 may comprise any suitable circuitry, such as read channel circuitry, servo control circuitry, a microprocessor configured to execute instructions stored on a computer readable medium, etc. When executing an access operation (write or read), the product control circuitry 52 selects a target head out of either the first set of heads or the second set of heads as well as transmits a write signal during write operations and receives a read signal during read operations. In this manner, the product control circuitry 52 operates the data storage device as a single channel device so as to reduce the cost of the product device by reducing the cost of the control circuitry as compared to the manufacture PCB 22.

In one embodiment, when executing concurrent operations the manufacture PCB 22 may execute concurrent access operations to top and bottom surfaces of a disk. For example, in one embodiment the manufacture PCB 22 may bank write servo sectors to the top and bottom surfaces in order to improve the coherency of the servo sectors. In this manner, when executing an access operation concurrently to top and bottom surfaces the coherency of the servo sectors enables the concurrent tracking of heads over the top and bottom surfaces. For example, the coherency of the servo sectors may enable the stroke of secondary actuators to track the deviations between top and bottom data tracks. In addition, the coherency of the servo sectors across the top and bottom surfaces may be substantially maintained in the event the disk is subject to thermal expansion or disk slip relative to a spindle of a spindle motor configured to rotate the disks.

Figure 5:
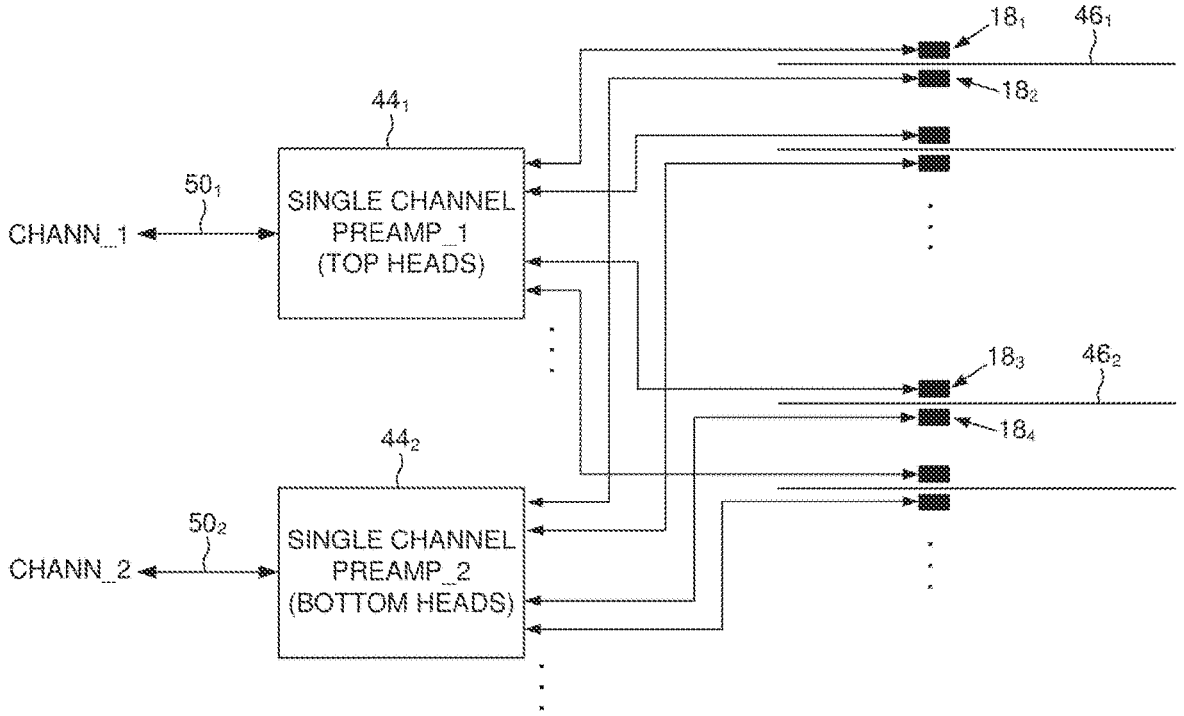
FIG. 5 shows an embodiment wherein the enclosure comprises a first single channel preamp circuit coupled to the top heads of multiple disks and a second single channel preamp circuit coupled to the bottom heads of the multiple disk surfaces.

FIG. 5 shows an embodiment wherein the enclosure 16 comprises a first single channel preamp $\mathbf{44}_1$ coupled to the top heads of the disks as well as coupled to the first manufacture control circuitry $\mathbf{48}_1$ over interface $\mathbf{50}_1$. The enclosure 16 further comprises a second single channel preamp $\mathbf{44}_2$ coupled to the bottom heads of the disks as well as coupled to the second manufacture control circuitry $\mathbf{48}_2$ over interface $\mathbf{50}_2$. The manufacture PCB 22 executes a concurrent access operation by selecting a top head serviced by the first single channel preamp circuit $\mathbf{44}_1$ and selecting a corresponding bottom head serviced by the second single channel preamp circuit $\mathbf{44}_2$.

In the embodiment of FIG. 5, there is an increased complexity in routing interface lines between the single channel preamp circuits $\mathbf{44}_1$ and $\mathbf{44}_2$ and the top and bottom heads (e.g., using a flex cable). This increase in routing complexity as illustrated in FIG. 5 is due to the interleaving of the interface lines between the first and second single channel preamp circuits $\mathbf{44}_1$ and $\mathbf{44}_2$. In one embodiment shown in FIG. 6, the routing complexity of FIG. 5 is avoided by using dual channel preamp circuits $\mathbf{56}_1$ and $\mathbf{56}_2$, wherein each dual channel preamp circuit is coupled to the manufacture control circuitry $\mathbf{48}_1$ and $\mathbf{48}_2$ over the interface $\mathbf{50}_1$ and $\mathbf{50}_2$. The first dual channel preamp circuit $\mathbf{56}_1$ is coupled to the top and bottom heads of a first set of disks (e.g., disk $\mathbf{46}_1$), and the second dual channel preamp circuit $\mathbf{56}_2$ is coupled to the top and bottom heads of a second set of disks (e.g., disk $\mathbf{46}_2$). When executing a concurrent access operation, the manufacture PCB 22 selects one of the first or second dual channel preamp circuits in order to concurrently access the top and bottom surfaces of a target disk. That is in this embodiment, each dual channel preamp circuit is capable of executing concurrent access operations to the top and bottom surfaces of a target disk, including to facilitate the concurrent transfer of write/read data to/from the manufacture PCB 22 over the interface $\mathbf{50}_1$ and $\mathbf{50}_2$. When the enclosure 16 is coupled to the product PCB 28, the product control circuitry 52 is coupled to the first and second dual channel preamp circuits $\mathbf{56}_1$ and $\mathbf{56}_2$ similar to the embodiment shown in FIG. 4B.

Figure 7:
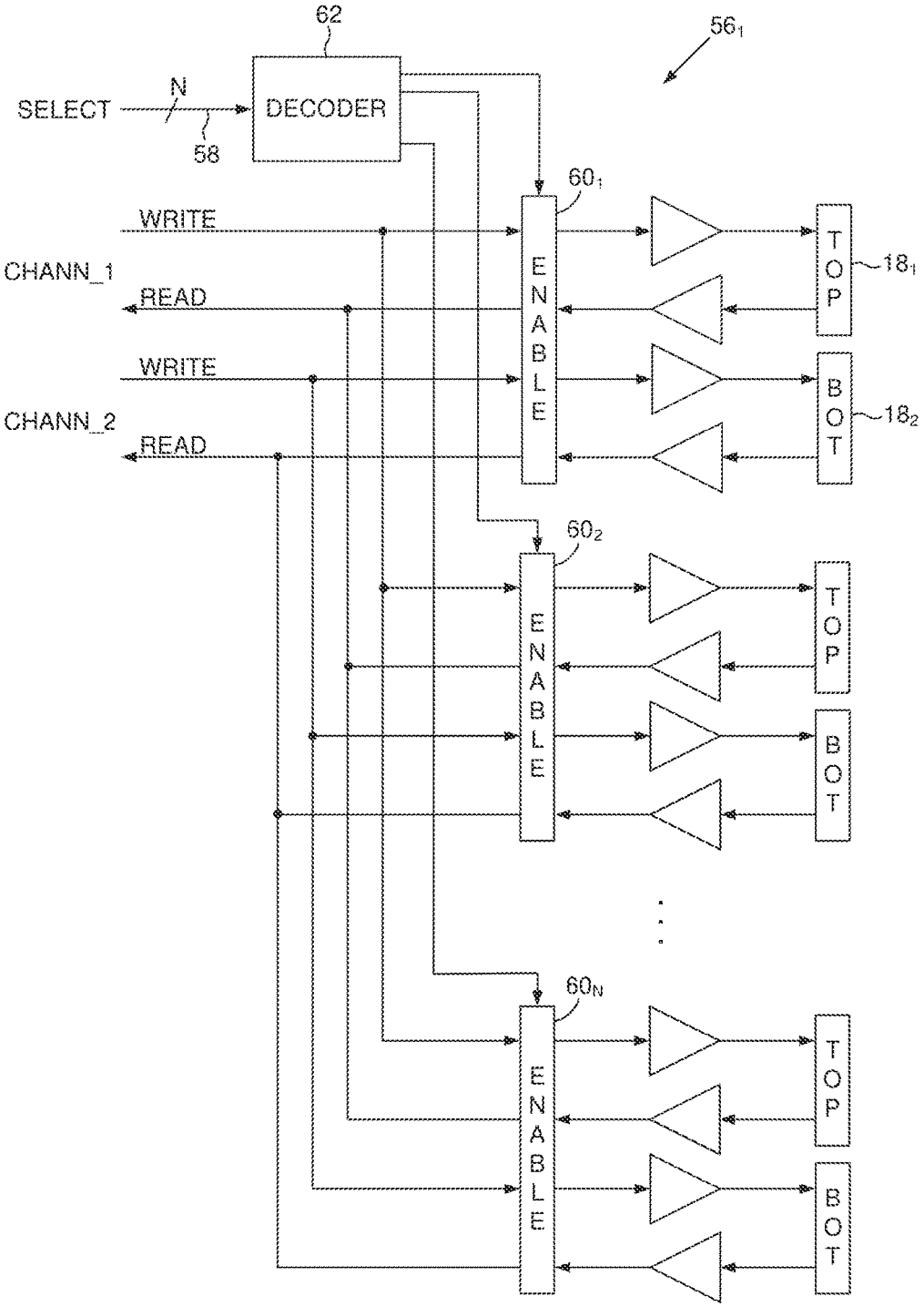
FIG. 7 shows a dual channel preamp circuit according to an embodiment comprising selection circuitry for applying channel signals to the top/bottom heads of a selected disk.

FIG. 7 shows an example of a dual channel preamp circuit $\mathbf{56}_1$ wherein the interface to the manufacture PCB 22 includes a selection control 58 for selecting top and bottom heads of a target disk, as well as a write/read interface for the first channel and a write/read interface for the second channel. The write/read interfaces of each channel are applied to enable circuits $\mathbf{60}_1$ to $\mathbf{60}_N$, wherein each enable circuit (e.g., enable circuit $\mathbf{60}_1$) is coupled to the top and bottom heads of a respective disk (e.g., top head $\mathbf{18}_1$ and bottom head $\mathbf{18}_2$). When executing a concurrent access operation, the selection control 58 is decoded by a decoder 62 in order to activate the enable circuit of a target disk, thereby enabling the concurrent access operation using the corresponding top and bottom heads.

Figure 6:
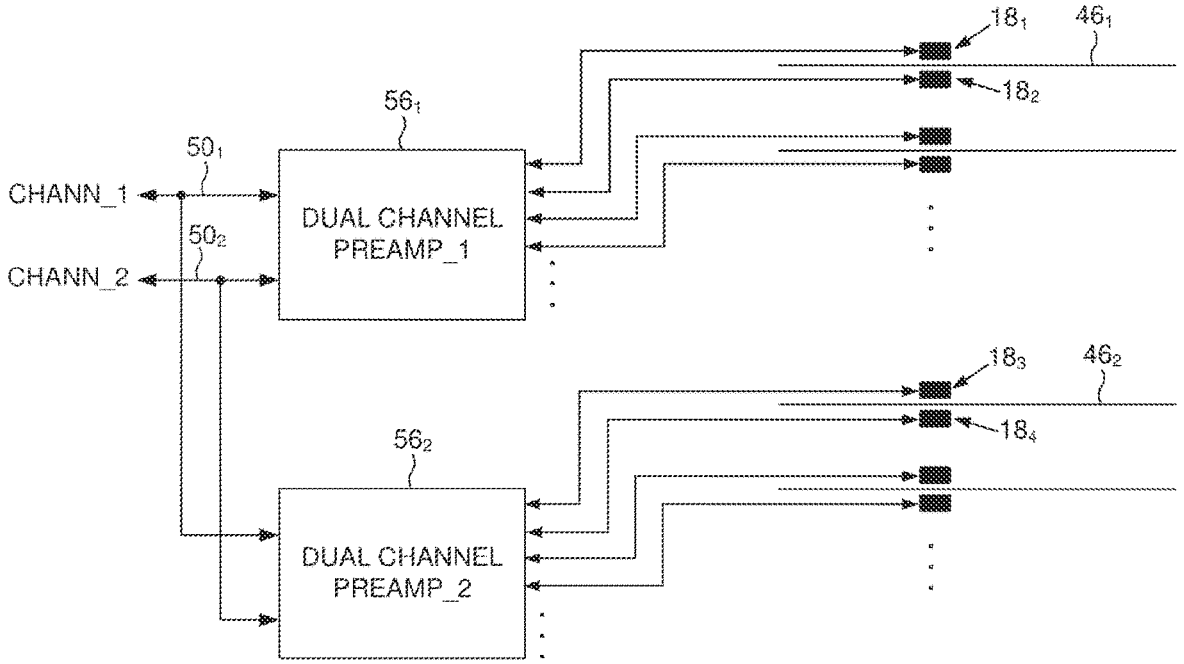
FIG. 6 shows an embodiment wherein the enclosure comprises a first dual channel preamp circuit coupled to top/bottom heads of a first set of disk surfaces and a second dual channel preamp circuit coupled to top/bottom heads of a second set of disk surfaces.

In one embodiment, the manufacture PCB 22 may comprise control circuitry capable of executing concurrent access commands to the top/bottom surfaces of multiple disks. That is in one embodiment, instead of the interfaces $\mathbf{50}_1$ and $\mathbf{50}_2$ being wire-ORed as shown in the embodiment of FIG. 6, in another embodiment the interfaces $\mathbf{50}_1$ and $\mathbf{50}_2$ may be multiplexed between multiple control circuitry of the manufacture PCB 22 so as to enable the concurrent access of top/bottom surfaces for a disk in the first set (corresponding to the first dual channel preamp circuit $\mathbf{56}_1$) and the top/bottom surfaces of a disk in the second set (corresponding to the second dual channel preamp circuit $\mathbf{56}_2$).

In the embodiments described above, the interface between the manufacture PCB 22 or product PCB 28 and the enclosure 16 may be implemented in any suitable manner. In one embodiment, the interface may comprise a parallel interface or a serial interface, or in another embodiment a combination of a parallel and a serial interface. For example, in one embodiment the write/read lines may be implemented using dedicated interface lines, whereas certain commands (e.g., the head selection command) may be transmitted to the preamp circuits over a serial interface. In yet another embodiment, the interface may comprise a wireless interface, such as a suitable Wi-Fi interface.

In one embodiment, the interface between the manufacture PCB 22 or product PCB 28 and the enclosure 16 may include control signals for controlling a primary actuator (e.g., a VCM 38) and one or more secondary actuators (e.g., a PZT) configured to actuate the heads radially over the disk surfaces. In one embodiment, the control signals for the secondary actuator(s) generated by the product PCB 28 may be effectively wire-ORed such as shown in FIG. 4B such that one of the heads may be actuated in fine movements while operating the data storage device as a single channel device.

In one embodiment after coupling the product PCB 28 to the enclosure 16, the product control circuitry 52 may execute additional manufacturing procedures prior to shipping the data storage device to a customer. For example, in one embodiment the product control circuitry 52 may execute manufacturing procedures that verify the functionality of the product PCB 28 as well as test and/or compensate for variations between the manufacture PCB 22 and the product PCB 28. In other embodiments, the product PCB 28 may execute any suitable finishing manufacturing procedures, such as executing additional testing/calibration procedures, and/or writing operating system and/or calibration data to one or more of the disks.

In the embodiments described above, the storage medium of the data storage device is a disk, such as a magnetic disk. Other embodiments may employ other types of storage mediums, such as a magnetic tape. That is, the enclosure 16 shown in FIG. 2A may comprise any suitable actuating mechanics configured to actuate write and read elements over any suitable storage medium, as well as optionally comprise one or more single channel and/or dual channel preamp circuits.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a data storage controller, or certain operations described above may be performed by a read channel and others by a data storage controller. In one embodiment, the read channel and data storage controller are implemented as separate integrated circuits, and in an alternative embodiment they are fabricated into a single integrated circuit or system on a chip (SOC). In addition, the control circuitry may include a suitable power large scale integrated (PLSI) circuit implemented as a separate integrated circuit, integrated into the read channel or data storage controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry. In some embodiments, at least some of the flow diagram blocks may be implemented using analog circuitry (e.g., analog comparators, timers, etc.), and in other embodiments at least some of the blocks may be implemented using digital circuitry or a combination of analog/digital circuitry.

In various embodiments, a disk drive may include a magnetic disk drive, a hybrid disk drive comprising non-volatile semiconductor memory, a tape drive, etc. In addition, some embodiments may include electronic devices such as computing devices, data server devices, media content storage devices, etc. that comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device comprising:

a first disk;

a top head actuated over a top surface of the first disk;

a bottom head actuated over a bottom surface of the first disk;

a second disk;

a top head actuated over a top surface of the second disk;

a bottom head actuated over a bottom surface of the second disk;

a dual channel preamp circuit coupled to the top and bottom heads of the first and second disks, the dual channel preamp circuit comprising:

a write line and a read line of a first channel;

a write line and a read line of a second channel;

first enable circuitry configured to couple at least one of the write line or the read line of the first channel to the top head of the first disk and to couple at least one of the write line or the read line of the second channel to the bottom head of the first disk; and second enable circuitry configured to couple at least one of the write line or the read line of the [second] *first* channel to the top head of the second disk and to couple at least one of the write line or the read line of the second channel to the bottom head of the second disk; and control circuitry configured to:

apply a selection signal to the dual channel preamp circuit to select between the first disk and the second disk; and execute a concurrent access operation of the top and bottom surface*s* of the selected disk using the dual channel preamp circuit.

2. The data storage device as recited in claim 1, wherein the dual channel preamp circuit *further* comprises selection circuitry configured to select between the first disk and the second disk in response to the selection signal received from the control circuitry.

3. The data storage device as recited in claim [1] *2*, wherein the selection circuitry is configured to enable the first enable circuitry or the second enable circuitry in response to the selection signal received from the control circuitry.

4. The data storage device as recited in claim 1, wherein the concurrent access operation comprises a first write operation to the top surface of the selected disk and a second write operation to the bottom surface of the selected disk, wherein the first write operation at least partially overlaps with the second write operation.

5. The data storage device as recited in claim 1, wherein the concurrent access operation comprises a first read operation to the top surface of the selected disk and a second read operation to the bottom surface of the selected disk, wherein the first read operation at least partially overlaps with the second read operation.

6. The data storage device as recited in claim 1, wherein the concurrent access operation comprises a write operation to the top surface of the selected disk and a read operation to the bottom surface of the selected disk, wherein the write operation at least partially overlaps with the read operation.

7. A dual channel preamp circuit comprising:

a write line and a read line of a first channel;

a write line and a read line of a second channel;

first enable circuitry configured to couple at least one of the write line or the read line of the first channel to a top head of a first disk and to couple at least one of the write line or the read line of the second channel to a bottom head of the first disk; and second enable circuitry configured to couple at least one of the write line or the read line of the [second] *first* channel to a top head of a second disk and to couple at least one of the write line or the read line of the second channel to a bottom head of the second disk.

8. The dual channel preamp circuit as recited in claim 7, further comprising selection circuitry configured to enable the first enable circuitry or the second enable circuitry in response to a selection signal corresponding to a selected one of the first or second disk.

9. The dual channel preamp circuit as recited in claim 8, wherein the dual channel preamp circuit is configured to execute a concurrent access operation of the top and bottom surface*s* of the selected disk.

10. The dual channel preamp circuit as recited in claim 9, wherein the concurrent access operation comprises a first write operation to the top surface of the selected disk and a second write operation to the bottom surface of the selected disk, wherein the first write operation at least partially overlaps with the second write operation.

11. The dual channel preamp circuit as recited in claim 9, wherein the concurrent access operation comprises a first read operation to the top surface of the selected disk and a second read operation to the bottom surface of the selected disk, wherein the first read operation at least partially overlaps with the second read operation.

12. The dual channel preamp circuit as recited in claim 9, wherein the concurrent access operation comprises a write operation to the top surface of the selected disk and a read operation to the bottom surface of the selected disk, wherein the write operation at least partially overlaps with the read operation.

[13. A data storage device comprising:

a first disk;

a top head actuated over a top surface of the first disk;

a bottom head actuated over a bottom surface of the first disk;

a second disk;

a top head actuated over a top surface of the second disk;

a bottom head actuated over a bottom surface of the second disk;

a dual channel preamp circuit coupled to the top and bottom heads of the first and second disks; and control circuitry configured to:

apply a selection signal to the dual channel preamp circuit to select between the first disk and the second disk; and execute a concurrent access operation of the top and bottom surface of the selected disk using the dual channel preamp circuit, wherein the concurrent access operation comprises a first write operation to the top surface of the selected disk and a second write operation to the bottom surface of the selected disk, wherein the first write operation at least partially overlaps with the second write operation.]

*14. The data storage device as recited in claim 1, wherein the dual channel preamp circuit further comprises means for selecting between the first disk and the second disk in response to the selection signal received from the control circuitry.*

*15. The dual channel preamp circuit as recited in claim 7, further comprising means for enabling the first enable circuitry or the second enable circuitry in response to a selection signal corresponding to a selected one of the first or second disk.*

*16. A data storage device comprising the dual channel preamp circuit of claim 7.*

* * * * *